United States Patent [19]
Case et al.

[11] 3,857,298
[45] Dec. 31, 1974

[54] NEUTRAL SAFETY LOCK FOR HYDRAULIC IMPLEMENT CONTROLS

[75] Inventors: Cecil L. Case; Ferol S. Fell; Merle K. Burkhart, all of Newton, Kans.

[73] Assignee: Hesston Corporation, Hesston, Kans.

[22] Filed: July 16, 1973

[21] Appl. No.: 379,556

[52] U.S. Cl.................... 74/469, 74/526, 180/6.48, 74/475, 74/527, 74/850
[51] Int. Cl............................................. G05g 5/08
[58] Field of Search............ 74/480, 483, 477, 526; 180/6.48

[56] References Cited
UNITED STATES PATENTS

| | | | |
|---|---|---|---|
| 2,419,258 | 4/1947 | Field | 74/483 X |
| 2,722,135 | 11/1955 | Taylor | 74/483 |
| 3,611,827 | 10/1971 | Bottum et al. | 74/471 |

*Primary Examiner*—Samuel Scott
*Assistant Examiner*—F. D. Shoemaker
*Attorney, Agent, or Firm*—Schmidt, Johnson, Hovey & Williams

[57] ABSTRACT

The two actuating levers of hydraulic pumps which control the direction and proportionate volumes of fluid flow to hydraulic motors in a hydraulic steering, speed, and direction control system may be locked in neutral by components located at the pumps but operated remotely from the cab of the vehicle. The geometry of the arrangement is such that any attempted movement on the part of the actuating levers once locked only tends to seat the locking components more firmly. Engine start-up is impossible unless the levers are locked in neutral.

15 Claims, 5 Drawing Figures

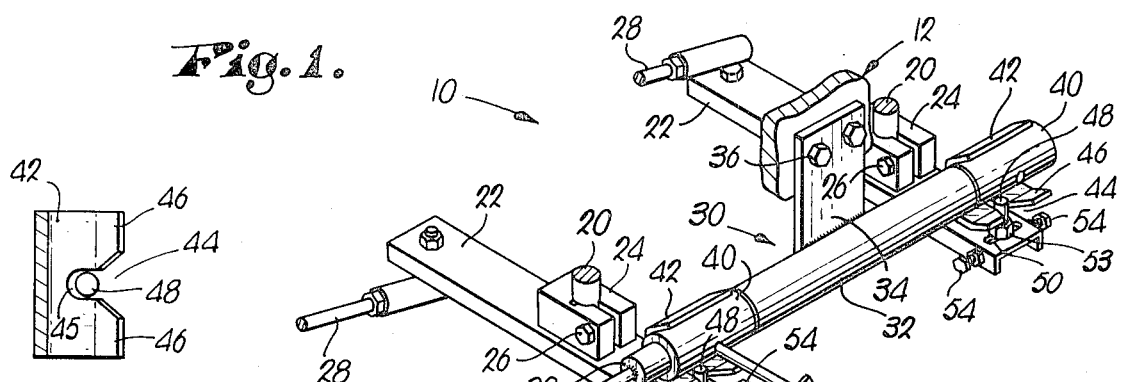
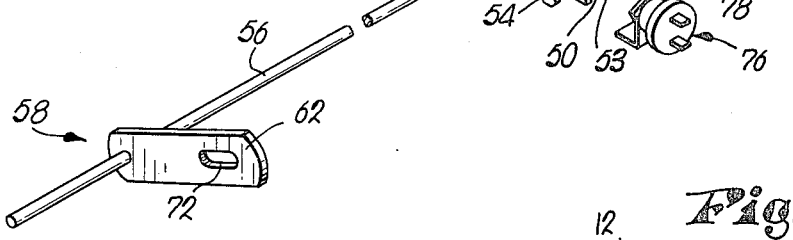
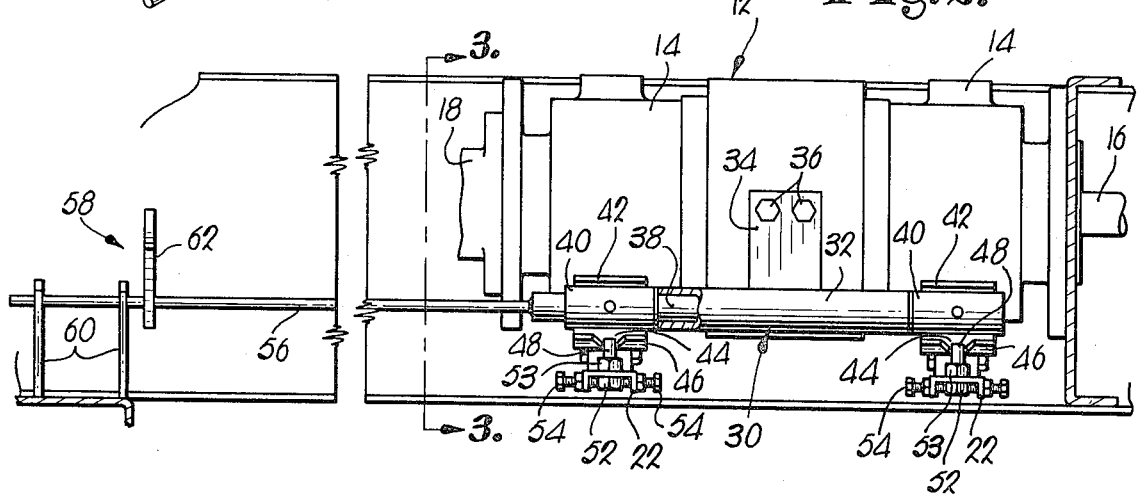
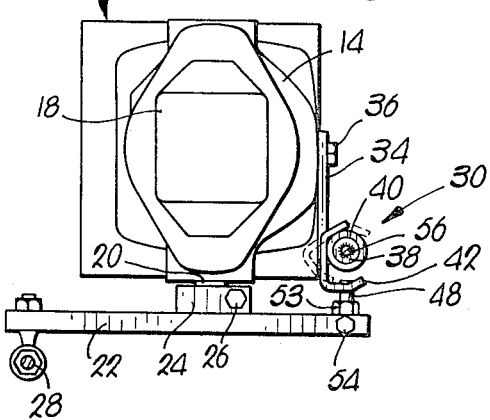
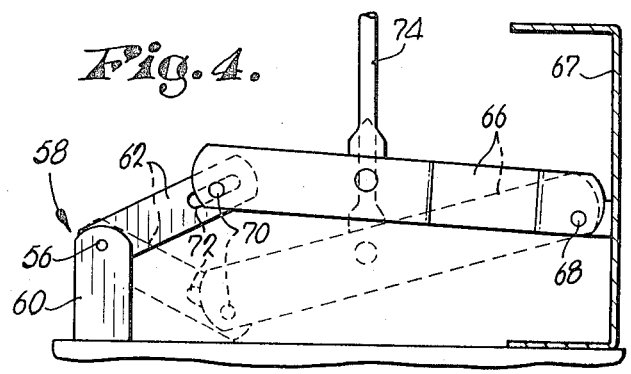

NEUTRAL SAFETY LOCK FOR HYDRAULIC IMPLEMENT CONTROLS

This invention relates to locking assemblies and more particularly to a locking assembly having special utility for use in connection with the steering, speed, and direction control of an implement.

Implements or vehicles having a pair of drive wheels on opposite sides thereof may be controlled by regulating the driving speeds of the wheels relative to one another. For example, instead of turning the wheels in unison to the left or right in order to turn the vehicle, it is only necessary to maintain the wheels in the same permanent, straight ahead alignment while slowing down or speeding up one wheel relative to the other. The vehicle then turns to the side having the slower wheel. If it is desired to drive the vehicle in a straight line, in forward or reverse, the wheels are both rotated at the same speed, the direction of their rotation determining whether the vehicle moves forwardly or reversely.

A number of control systems for hydraulically regulating the steering, speed, and direction of vehicles have heretofore been provided, and among these is the system disclosed in U.S. Pat. No. 3,431,993 to Case, of Mar. 11, 1969. This patent is hereby incorporated by reference into the present specification as need be for a full and clear understanding of the present invention. The system of this patent employs a hydraulic motor at each drive wheel, a pair of variable displacement pumps that supply fluid to the motors in either of two opposite directions, and linkage structures leading from the pumps to the cab area of the vehicle for manual actuation by the operator. In addition, the system provides for locking the controls in a neutral condition by tipping a pair of foot-operated lock pedals until their notches engage and catch the linkage structure disposed beneath the floor of the operating cab. As long as the linkage structure remains caught by the lock pedals, the hydraulic pumps do not circulate fluid to the drive motors, and the vehicle remains in neutral. When the pedals are operated to release the linkage, the pumps can again be actuated.

Therefore, one important object of the present invention is to provide a mechanical neutral safety lock which positively prevents any possibility of the vehicle creeping, once its hydraulic system has been locked in a neutral condition, regardless of any repetitious and variable loads which may be placed on structural parts of the vehicle as a result of the operator climbing off and on the vehicle.

Pursuant to the foregoing, another important object of this invention is to mount components of the lock assembly on the pumps themselves, rather than on the floor of the operator cab, thus assuring that, relative to one another, the pumps and their supported lock components are unaffected by deflections of the cab floor and all linkage structure.

It is also an important object to provide a neutral lock whose components tend to seat more firmly in interlocked relationship with one another in response to any attempted movements on the part of the actuating structures of the system.

An additional important object of the instant invention is to provide an effective neutral lock as aforesaid which cooperates with the starter circuit of the vehicle to preclude start-up of the engine unless the hydraulic speed and direction control of the vehicle is in neutral and is locked by the neutral lock.

A further important object of this invention is to provide a neutral lock of rugged construction, capable of withstanding the substantial forces applied thereto during implementation of the lock so as to provide long-lived, mechanically trouble-free operation.

In the drawing:

FIG. 1 is a fragmentary perspective view, partially in section, showing the neutral lock of the present invention in association with certain components of the hydraulic steering and speed control of a vehicle;

FIG. 2 is a fragmentary, side elevational view of the neutral lock and associated control partially shown in FIG. 1, parts being broken away and shown in cross-section for clarity;

FIG. 3 is a cross-sectional view of the control and lock taken along line 3—3 of FIG. 2, exclusive of the mounting structure for the control, the unlocking position of the neutral lock being indicated by dashed lines;

FIG. 4 is an elevational view of a portion of the operating linkage for the neutral lock illustrating alternative positions of the linkage; and FIG. 5 is an enlarged fragmentary plan view of a locking clip of the neutral lock illustrating details of the receiving mouth of the clip.

The hydraulic steering and speed control 10 is only fragmentarily shown throughout the views of the drawing, but it is to be understood that, in principle, control 10 operates in the same general fashion as that of the incorporated patent. In this respect, the control 10, as the control of said patent, may regulate the relative amounts of fluid supplied to the hydraulic motors of drive wheels on the vehicle with which control 10 is associated. When equal amounts of fluid are supplied to both motors, the vehicle may be driven in forward or reverse directions in a straight line, depending upon the direction of the fluid. On the other hand, when unequal amounts of fluid are directed to the hydraulic motors, the result is a change in the driving speed of one wheel relative to the other, hence effecting turning of the vehicle toward the side with the slower wheel.

In the arrangement shown for purposes of illustration, control 10 includes a pump body located at the rear of the vehicle and broadly designated by the numeral 12, having a pair of individually operable fluid-regulating pumps or devices 14 driven by the common power input shaft 16 of a prime mover (not shown) of the vehicle. A third fluid-regulating pump or device 18 of body 12 may be utilized in conjunction with devices 14 for controlling raising and lowering of a header, should one be provided on the vehicle with which control 10 is associated.

Each pump 14 is substantially the same as the pumps of the incorporated patent and has a rotatable shaft member 20 controlling a swash plate (not shown) within the pump 14, the rotative position of shaft 20 determining the direction and amount of fluid flow from its pump 14 to the corresponding hydraulic motor, and each shaft member 20 being operable between a pair of opposed limits corresponding to maximum fluid flow conditions by an actuating lever 22. The midpoints of the rotative displacements of shafts 20 correspond to neutral fluid flow conditions wherein fluid is diverted from the hydraulic motors so that neither driving nor steering of the vehicle is caused.

Each actuating lever 22 is secured to its corresponding shaft 20 intermediate the ends of lever 22 by a split clamp 24 controlled by a drawbolt 26. One end of the levers 22 is connected to suitable operating means in the nature of push-pull rods 28 leading forwardly to steering and speed apparatus in the forward operating cab of the vehicle such as, for example, that shown in the aforesaid patent. The rods 28 may be pushed or pulled in unison so as to swing levers 22 by equal amounts and in the same direction, or rods 28 may be pushed or pulled in opposite directions in proportionate amounts so as to swing levers 22 in directions which cause turning of the vehicle. The levers 22 swing in a common, horizontal plane normal to the axis of the valve members 20.

The lock assembly for maintaining the pump devices 14 in a neutral condition is denoted broadly by the numeral 30 and includes a supporting tube 32 welded to a mounting plate 34 which is joined to the pump body 12 on the side of the latter opposite the rods 28 by fasteners 36. A central shaft 38 is rotatable concentrically within tube 32 and has a pair of sleeves 40 keyed thereto at opposite ends thereof for rotation therewith. Each sleeve 40 has a generally C-shaped keeper or catch component 42 secured to its outer periphery for movement between the solid and dotted line positions of FIG. 3 when shaft 38 is rotated. An outwardly flared mouth 44 is formed in each catch 42 between a pair of opposed legs 46, and a cavity 45 is located at the inner extremity of mouth 44.

The mouth 44 of each receiving catch 42 is configured to receive in latching engagement an upstanding bolt component on the adjacent end of the corresponding lever 22, such component being in the form of a projection or pin 48. The pin 48 of each lever 22 is adjustably shiftable laterally of its lever 22 within an elongated, laterally extending slot 50, having a head 52 below slot 50 and a releasable nut 53 thereabove. Bolt and nut type adjusters 54 projecting from opposite sides of each lever 22 bear against head 52 of the pin 48 for incremental movement of pin 48 within slot 50.

The vertical plane containing the common axis of tube 32, shaft 38, sleeves 40 and catches 42 is disposed substantially tangentially to the arcuate paths described by pins 48 during swinging of levers 22. Thus, any attempted further swinging of pins 48 in either direction beyond their neutral positions when locked results in a force vector being directed radially inwardly, hence into the mouths 44. Pins 48 therefore only seat themselves more firmly in cavities 45.

A torsion rod 56 is affixed to the outwardly projecting end of lock shaft 38 and comprises a part of an operating linkage 58 for lock assembly 30. Torsion rod 56 is supportd for rotation about its longitudinal axis by a pair of spaced-apart supports 60, and a crank 62 affixed to rod 56 comprises a part of a toggle mechanism 64 of linkage 58 for rotating torsion rod 56 and for releasably holding the same in either of two rotative positions corresponding to the alternative conditions of the toggle mechanism 64 illustrated in FIG. 4. The solid and dashed line conditions of toggle 64 in FIG. 4 correspond to the solid and dashed line conditions respectively of catches 42 in FIG. 3. A link 66 of toggle 64 is pivoted at one end to supporting structure 67 of the vehicle for swinging about an axis at 68 and has a pin 70 at the opposite end thereof which travels in an elongated slot 72 in crank 62. A vertically extending push-pull rod 74 secured to link 66 intermediate its opposed ends leads to the operator cab of the vehicle, rendering the lock assembly 30 fully actuatable by the operator remote from the assembly 30 itself.

A control switch 76 for the starter circuit of the vehicle is mounted adjacent locking assembly 30 with its swingable, spring-loaded control arm 78 in disposition to be operated by a finger 80 projecting laterally outwardly from one of the sleeves 40 of assembly 30. Switch 76 is operable to maintain the starter circuit open when arm 78 is depressed, and closed when arm 78 has sprung upwardly. Accordingly, finger 80 depresses arm 78 to open the circuit when the catches 42 are rotated back into the dotted line position of FIG. 3 and allows arm 78 to swing upwardly to close the circuit when the catches 42 are rotated forwardly to their full-line, locking positions illustrated throughout the Figures.

From the foregoing description, the operation of the neutral lock assembly 30 should be apparent. When the levers 22 are disposed by rods 28 in their neutral positions so that no fluid is delivered to the hydraulic motors of the vehicle drive wheels, the operator may pull rod 74 upwardly so as to swing crank 62 in an upward direction which rotates catches 42 counterclockwise viewing FIG. 3 into position receiving the pins 48 within mouths 44. In this disposition, the levers 22 are firmly and rigidly held against swinging because of the confinement of pins 48 within mouths 44. In this respect, note that rotation of the catches 42 in a plane normal to the planes of swinging of levers 22 assures a very positive reception of pins 48 within mouths 44. Moreover, the assembly 30 itself is very firmly held by pump body 12 against displacement in any direction which would permit swinging of levers 22.

Release of levers 22 is very easily accomplished by simply pushing rod 74 downwardly to break toggle 64 and hence crank the torsion rod 56 in a clockwise direction viewing FIG. 3 a sufficient extent to rotate catches 44 back into clearing relationship with pins 48. Levers 22 are thus free to swing about the axes of members 20, carrying out their speed, direction and steering functions.

It is to be noted that the outwardly flared configuration of the mouths 44 means it is not necessary for the levers 22 to be precisely in their neutral positions before actuating assembly 30 to lock levers 22. Should the pins 48 be disposed slightly to one side of the center lines of mouths 44, the sloping edges of the catch legs 46 defining each mouth 44 will operate to forcefully guide the corresponding pin 48 deeply into mouth 44 and into cavity 45 as the catches 42 are progressively rotated into their locking positions. Thus, the levers 22 are automatically cammed into their full neutral positions by catches 42 in the event that levers 22 are initially not exactly in neutral.

The finger 80 and the control switch 76 function in the manner earlier described to prevent starting of the engine unless the levers 22 are locked in their full neutral positions by assembly 30. In this respect, the assembly 30 is so designed that it is impossible to arrive at a situation wherein the levers 22 are locked out of neutral positions in locations of fluid flow so that the vehicle would lurch in one or more directions when started up. This dangerous condition could be presented if it were possible for the pins 48 to be disposed laterally outside of one or the other of the legs 46 of catches 42 when the catches 42 are rotated into their locking positions. This would mean that when the catches 42 were rotated in the reverse direction out of their locking positions to depress switch arm 78 and close the starter circuit, fluid would immediately surge to the hydraulic motors of the drive wheels upon start-up.

This condition has been completely avoided in the present invention by correlating the widths of the legs 46 with the angular displacement of the valve shafts 20 such that, even when the shafts 20 are at either of their opposite extremes of rotation, the pins 48 are still disposed within the limits of legs 46. Therefore, even though the pins 48 may not be in the proper position to enter mouths 44, they cannot slip past catches 42 on the outside edges of legs 46 when catches 42 are rotated into their locking positions. This means that the pins 48 are struck by the leading ends of legs 46 such that further rotation of catches 42 into their locking positions is precluded, hence preventing switch arm 78 from being depressed sufficiently to close the starter circuit. Therefore, once the engine is shut off, it cannot again be started until the levers 22 have been properly swung to their neutral positions, allowing pins 48 to be fully received within the mouths 44 and cavities 45 of catches 42.

It is contemplated that toggle 64 of the linkage 58 will be coupled with safety brake (not shown) for the vehicle such that actuation of rod 74 to operate lock assembly 30 simultaneously applies or releases the safety brake. Accordingly, it is important that the safey brake be applied even in those situations where existence of the levers 22 out of their neutral positions prevents locking of assembly 30. This is easily accomplished by providing the torsion rod 56 with the inherent ability to twist a sufficient extent to allow rod 74 to be pulled upwardly to its fullest extent, hence applying the safety brake, even when the pins 48 are disposed to strike the leading ends of legs 46 instead of entering mouths 44. Thus, even though the control 10 may not be locked in a neutral condition by assembly 30 in such situations, the vehicle is nonetheless safely held against movement by the applied safety brake.

Noteworthy also is the adjustability of the pins 48 laterally with respect to their corresponding levers 22. By releasing and tightening the appropriate adjusters 54 to shift pins 48 in the proper direction within slots 50, the locations of pins 48 can be accurately correlated with the neutral positions of levers 22. In this manner, it is assured that when the pins 48 are fully received within mouths 44, the levers 22 are, in fact, locked in neutral, rather than allowing a small degree of fluid to flow to the hydraulic motors of the drive wheels and cause the implement to "creep".

Also of prime importance is the location of lock assembly 30 in close proximity to the devices 14 which it controls, and in fact, the essentially unitary relationship therewith by virtue of the rigid mounting of assembly 30 on pump body 12. This eliminates any creeping heretofore experienced as a result of deflection of the parts upon which the linkages and neutral locks of previous systems were supported. In the highly unlikely event that the pump body 12 should move in any given direction as a result of some type of deflection, lock assembly 30 must also move to the exact same extent so that no relative movement between body 12 and lock assembly 30 can arise to effect slight actuation of levers 22. Hence, control 10 is very firmly and positively held against accidental actuation to any degree when assembly 30 is properly locked.

It is also important to note that because of the special geometrical relationship between catches 42 and pins 48, any attempt on the part of levers 22 to swing in either direction, once locked in neutral, results in the pins 48 seating themselves even more deeply into mouths 44 and cavities 45. Because the axis of catches 42 is in a vertical plane that is tangent to the arcuate paths of pins 48 at the neutral point, any arcuate movement of a pin 48 in either direction has a radially inwardly directed vector which tends to lock the assembly 30 even further, rather than releasing the same.

Having thus described the invention, what is claimed as new and desired to be secured by Letters Patent is:

1. In a hydraulic control:
  a pair of individually operable, variable displacement, fluid-regulating devices each having a rotatable control member;
  an actuating lever for each of said members;
  a first lock component on each of said levers and swingable therewith during actuation of the devices by the levers; and
  a pair of second lock components mounted for movement in unison and in spaced-apart relationship along fixed, respective paths of travel intersecting those of the corresponding first components for releasably holding the levers against swinging when the first and second components are interengaged.

2. In a hydraulic control as claimed in claim 1, wherein said second components are mounted for rotation and the axis of each is disposed in parallelism with the swinging of said levers.

3. In a hydraulic control as claimed in claim 2, wherein said second components are rotatable in planes normal to the swinging of their respective levers.

4. In a hydraulic control as claimed in claim 2, wherein said levers swing in a common plane.

5. In a hydraulic control as claimed in claim 2, wherein said second components are rotatable about a common axis disposed in a plane that is substantially tangential to the arcuate paths of travel described by said first components.

6. In a hydraulic control as claimed in claim 1, wherein said second components are supported for rotation along said paths of travel and are provided with a common torque rod for operating the same.

7. In a hydraulic control as claimed in claim 6, wherein said torque rod is provided with a toggle crank for rotating the rod and holding the same in either one of a pair of alternative locking and unlocking positions.

8. In a hydraulic control as claimed in claim 1, wherein said first components each include a rigid projection and said second components each include a receiver having an entrance mouth for the corresponding projection.

9. In a hydraulic control as claimed in claim 8, wherein said mouth is outwardly flared for guiding the projection into the mouth as the receiver is moved.

10. In a hydraulic control as claimed in claim 8, wherein said projection is provided with means adjustably holding the same in any one of a number of selected lateral positions on its lever for varying the rotative position in which the corresponding control member is locked.

11. In a hydraulic control as claimed in claim 1, wherein said control members are each rotatable between a pair of opposed limits corresponding to maximum fluid flow in opposite directions, said components being disposed to interengage when said members are intermediate their respective limits corresponding to a neutral condition without fluid flow in either of said opposite directions.

12. In a hydraulic control as claimed in claim 11, wherein one component of each pair of first and second components is adjustable in a direction to permit variation in the point of interengagement of the components, thereby affording accurate correlation of component interengagement with said neutral fluid flow condition.

13. In a hydraulic control:
 a variable displacement fluid regulating device having a control member rotatable about a first axis;
 an actuating lever for said member swingable in a plane normal to said axis of the member;
 a first locking component mounted on said lever for movement therewith during swinging of the lever to actuate said member; and
 a second locking component mounted for rotation about a second axis extending in parallelism with the plane of swinging of said lever, said second component being movable along a fixed, arcuate path of travel to and from a position wherein said second component latchingly engages the first component to releasably hold the member against actuation.

14. In a hydraulic control as claimed in claim 13, wherein said first component includes a projection, said second component including a receiver for said projection.

15. In a hydraulic control as claimed in claim 13, wherein one of said components is adjustable in a direction to permit variation of the point of interengagement of the components.

* * * * *